(12) United States Patent
Thompson

(10) Patent No.: US 9,378,070 B2
(45) Date of Patent: Jun. 28, 2016

(54) GENERIC DISTRIBUTED PROCESSING UNIT FOR MULTI-AGENT SYSTEMS

(71) Applicant: Introspective Power, Inc., Broomfield, CO (US)

(72) Inventor: Anthony Scott Thompson, Broomfield, CO (US)

(73) Assignee: INTROSPECTIVE POWER, INC., Broomfield, CO (US)

( * ) Notice: Subject to any disclaimer, the term of this patent is extended or adjusted under 35 U.S.C. 154(b) by 139 days.

(21) Appl. No.: 14/171,375

(22) Filed: Feb. 3, 2014

(65) Prior Publication Data

US 2014/0222887 A1    Aug. 7, 2014

Related U.S. Application Data

(60) Provisional application No. 61/759,864, filed on Feb. 1, 2013.

(51) Int. Cl.
*G06F 15/16* (2006.01)
*G06F 9/54* (2006.01)
*H04L 29/08* (2006.01)

(52) U.S. Cl.
CPC ............ *G06F 9/542* (2013.01); *G06F 9/541* (2013.01); *H04L 67/10* (2013.01)

(58) Field of Classification Search
USPC ................................. 709/201, 200, 229, 224
See application file for complete search history.

(56) References Cited

U.S. PATENT DOCUMENTS

| | | | |
|---|---|---|---|
| 5,822,585 A | 10/1998 | Noble et al. | |
| 6,088,689 A | 7/2000 | Kohn et al. | |
| 7,043,522 B2 | 5/2006 | Olson et al. | |
| 7,146,232 B2 | 12/2006 | Staron et al. | |
| 7,742,436 B2 | 6/2010 | Carrillo et al. | |
| 8,095,923 B2 | 1/2012 | Harvey et al. | |
| 8,260,739 B1 | 9/2012 | Pelletier | |
| 2002/0016639 A1* | 2/2002 | Smith .................... | G05B 15/02 700/9 |
| 2002/0138571 A1* | 9/2002 | Trinon ................... | G06Q 10/06 709/204 |
| 2002/0147737 A1 | 10/2002 | Todokoro et al. | |
| 2007/0112574 A1 | 5/2007 | Greene | |
| 2008/0222243 A1 | 9/2008 | Shaw | |
| 2008/0261600 A1 | 10/2008 | Somasundaram et al. | |
| 2010/0063614 A1 | 3/2010 | Rosenboim et al. | |
| 2012/0072480 A1 | 3/2012 | Hays et al. | |
| 2012/0079066 A1 | 3/2012 | Li et al. | |

(Continued)

FOREIGN PATENT DOCUMENTS

CN    102130503 A    7/2011

OTHER PUBLICATIONS

Green, Shaw, et al. "Software Agents: A Review," Broadcom Ireland, May 27, 1997, 51 pages.

(Continued)

*Primary Examiner* — El Hadji Sall
(74) *Attorney, Agent, or Firm* — Nixon & Vanderhye P.C.

(57) ABSTRACT

Generic Distributed Processing Unit (DPU) for Multi-Agent Systems (MAS) is disclosed. The DPU based system is a Machine 2 Machine (M2M) interface that is fast, flexible, redundant and scalable. It allows the handling of unlikely edge cases that Human Machine Interfaces (HMI) can not. It also allows the processing of excessive amounts of ancillary data that are not processed easily with an HMI arrangement. In the digital ecosystem, any like DPU can back up any other making the system exceedingly robust.

2 Claims, 3 Drawing Sheets

Event Processing

(56) References Cited

U.S. PATENT DOCUMENTS

2012/0089523 A1    4/2012   Hurri et al.
2012/0278549 A1   11/2012   Dutton et al.
2012/0310424 A1   12/2012   Taft
2012/0311614 A1   12/2012   DeAnna et al.

OTHER PUBLICATIONS

Rad, Babak Rezaei, et al., "Computational Grid as an Appropriate Infrastructure for Ultra Large Scale Software Intensive Systems," 2010 International Conference on Complex, Intelligent and Software Intensive Systems, IEEE Computer Society, 2010, pp. 469-474.

St. John, Jeff, "Silver Spring Promises the Grid Network as Computing Platform: Reimagining the role of smart meters, grid sensors, home energy monitors and other devices at the grid edge," Greentech Media, Jan. 27, 2014, 8 pages.

Tordsson, Johan, "Portable Tools for Interoperable Grids: Modular Architectures and Software for Job and Workflow Management," PhD Thesis, Umea University, Sweden, Mar. 2009, 84 pages.

Office Action dated May 9, 2014, issued in related U.S. Appl. No. 14/171,143.

International Search Report and Written Opinion of the International Searching Authority mailed Jul. 1, 2014, issued in corresponding International Application No. PCT/EP2014/014438.

Schmidt et al., "Pattern-Oriented Software Architecture, Patterns for Concurrent and Networked Objects, vol. 2," J. Wiley & Sons, 2000, ISBN 0471606952.

Shirazi et al., "Scheduling and Load Balancing in Parallel and Distributed Systems," IEEE Computer Society Press, 1995, ISBN 0-8186-6587-4.

Tanenbaum, "Distributed Operating Systems," Prentice Hall, Inc., 1995, ISBN 0-13-219908-4.

Thompson, "Concepts in Modular Computing Design for Complex Systems," Thesis submitted to the University of Colorado at Denver, 2002.

\* cited by examiner

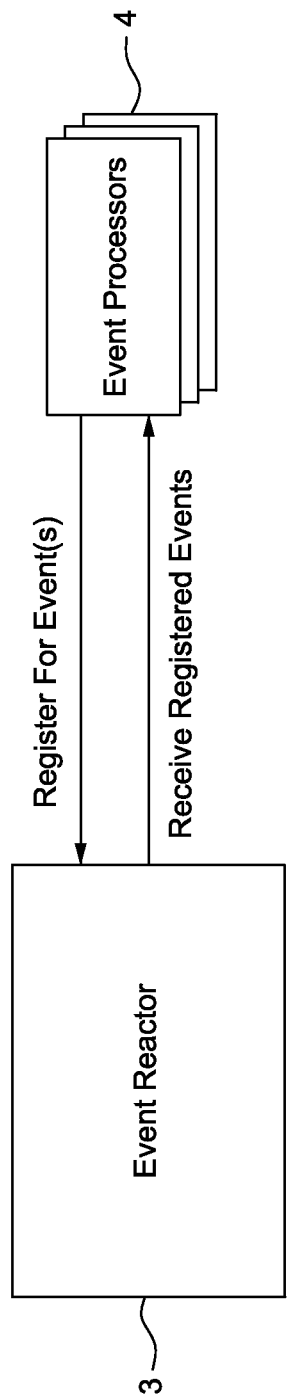
*Figure 1 - Event Processing Registration*

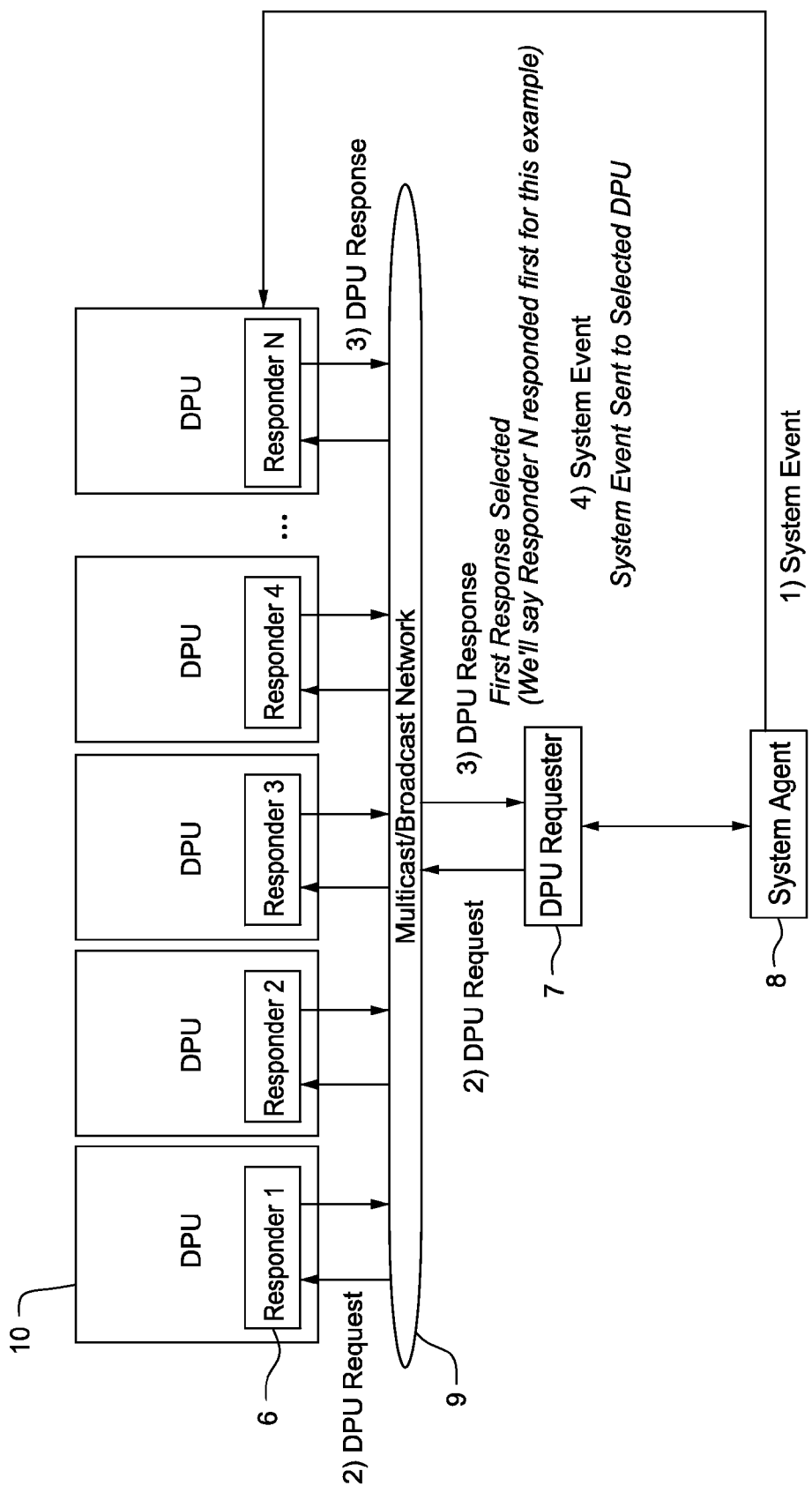
*Figure 2 - Event Processing Registration*

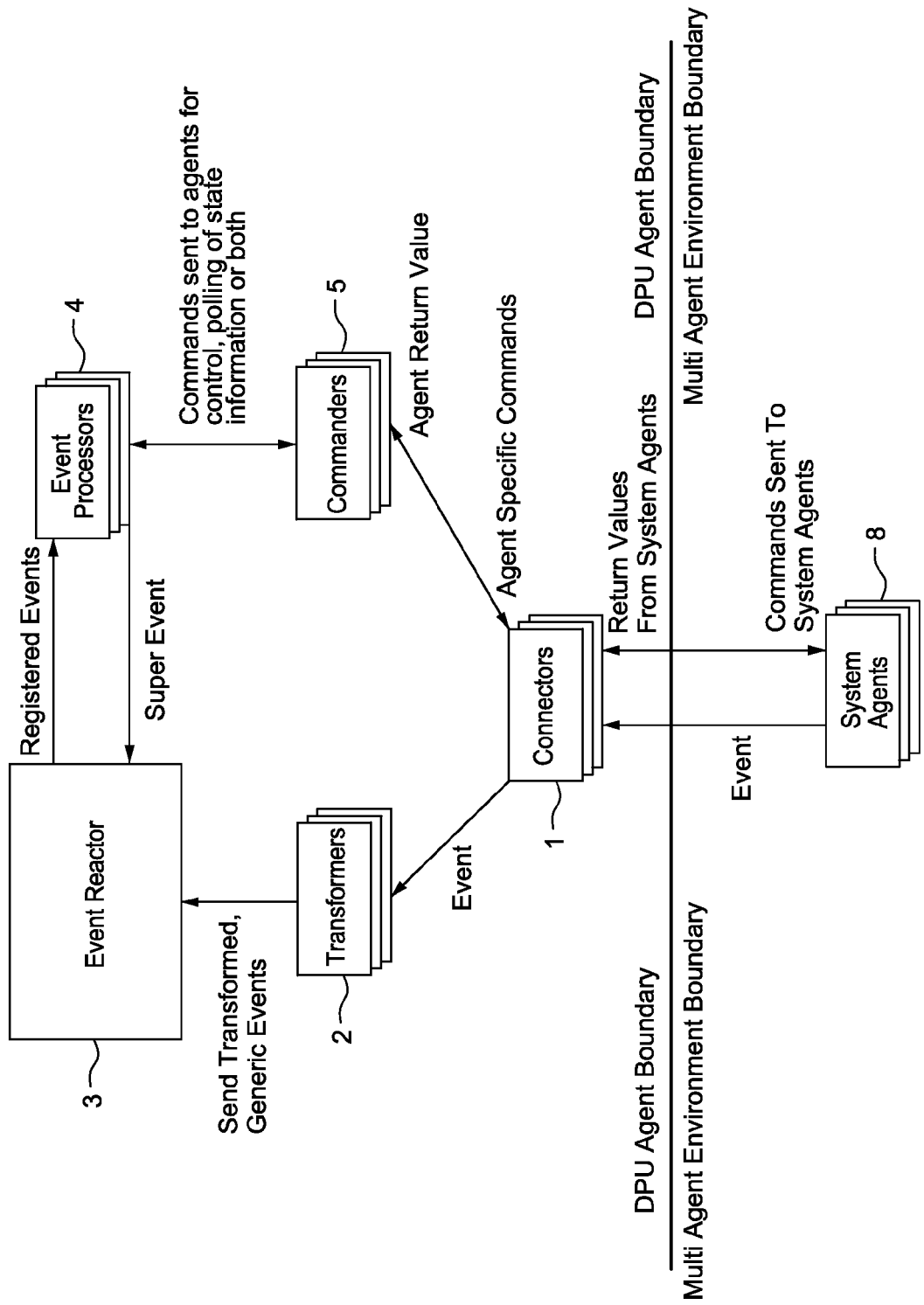
*Figure 3 - Event Processing*

GENERIC DISTRIBUTED PROCESSING UNIT FOR MULTI-AGENT SYSTEMS

CROSS-REFERENCE TO RELATED APPLICATION

This application claims the benefit of U.S. Provisional Patent Application No. 61/759,864 filed Feb. 1, 2013, incorporated herein by reference.

BACKGROUND

Problem Solved

Currently there are many industries that have distributed, heterogeneous systems that make up a larger multi-agent ecosystems. For the most part, coordination of these systems is managed manually with the control agents being humans. In some cases, humans can not react fast enough. In others, the solution is not robust and does not have an adequate backup. Lastly, human based systems are hard to scale. Facilities for humans are expensive to build and take time to construct. Training for complex tasks is expensive, takes time and may not be possible for critical, rarely encountered edge cases. In disaster situations, these limitations can compound already trying situations.

This was initially designed to be a generic Distributed Processing Unit (DPU) for a wide area Multi-Agent Systems (MAS). On further inspection, it has been concluded this solution can be applied to a MAS of any size: from a microprocessor to a digital ecosystems spanning the globe.

Existing systems, for the most part, only work with heterogeneous equipment or a subset of all the equipment, have little automation of on the market. Other solutions are also not as flexible and have a concept of centralized control with a single master server/process. Other systems also depend on Human Machine Interface (HMI) that require users to process large data sets quickly.

The DPU based system is a Machine 2 Machine (M2M) interface that is faster, more redundant, scalable and can handle unlikely edge cases. In the ecosystem, any like DPU can back up any other making the system exceedingly robust.

BRIEF DESCRIPTION OF THE DRAWINGS

FIG. 1 shows Event Processing Registration;
FIG. 2 shows Event Processing Registration; and
FIG. 3 shows Event Processing.

DETAILED DESCRIPTION

Description

This invention provides unified control over either a collection of discrete elements or acts as a System of Systems (SoS) controlling other control systems. A DPU can also be applied recursively or contain a hierarchy of implementations. In this way, the DPU is a framework for creating a digital MAS and can be used to create Software Agents to control existing System Elements. This invention reacts to conditions created either by events in the controlled digital ecosystem or external events that will affect that digital ecosystem.

The invention is also designed to be implemented in redundant manner so, when there are multiple DPUs available, it can fail-over automatically to another like DPU on outage. In this way, it creates a robust and redundant overall ecosystem.

The technology also allows for "hot" deploys/removals. This means the system can be expanded or contracted quickly with minimal cost.

The claimed invention differs from what currently exists. This system is a cloud based highly scalable solution with a high degree of automation that works with a heterogeneous set of elements. Other solutions are not robust because of manual processes, single point of failure and/or minimal redundancy. Most solutions also have poor heterogeneous support working for one vendor or having long lead times for new support.

The DPU based system is a Machine 2 Machine (M2M) interface that is faster, more redundant, scalable and can handle unlikely edge cases. In the ecosystem, any like DPU can back up any other making the system exceedingly robust. The Version Discussed Here Includes:

1. Connectors—Controls communication between the system and machines and data sources.
2. Transformers—Transforms messages from different machines into a common format
3. Event Reactor—Takes events from different data sources (including machines) and routes them to appropriate processors.
4. Event Processors—Registers for various events, analyzes the input and takes actions.
5. Commander—Sends commands to different systems in the ecosystem and allowing them to access in a common way.
6. Responder—Responds to processing requests and returns information about how to call the connector to fulfill a request.
7. DPU Requestor—This process makes requests to find the optimal Distributed Processing Unit.
8. System Agent—An external device or system that sends events and/or can be controlled by the system. This can be a System Element or another system all together (SoS arrangement)
9. Multicast Network—Used by the Requester to send out requests to all Responders.
10. DPU—Collection of items 1-6 that works as a single processing unit.

Relationship Between the Components:
Pre-Processing:
Event Processing Registration—Item 3 (Event Reactor) is the registrar for events item 4 (Event Processor) is interested in. Item 4 (Event Processor) may register with item 3 (Event Reactor) for multiple events. (See FIG. 1).

DPU Selection—This uses a Broadcast Request Reply design pattern to select the optimal processing unit. Item 8 (System Agent) makes a request through Item 7 (DPU Requester) using item 9 (Multicast/Broadcast Network) to item 6 (Responder). The request contains the System Agent type. If the System Agent type is supported by a given DPU, Item 6 (Responder) responds with the information need for that item 10's (DPU's) item 1 (Connector). Item 6 (DPU Requester) will accept the first response as being the optimal choice using the latency of the response to be the deciding factor. Item 7 (DPU Requester) will pass the information on to item 8 (System Agent) supplying the connectivity information. Once that is chosen, requests are made to the selected item 10's (DPU) item 1 (Connector). This process can and should be repeated periodically to make sure the optimal item 10 (DPU) is selected. In the case where a response to a request does not happen fast enough or events are not acknowledge, this procedure should be repeated immediately and the event or request resent. (See FIG. 2)

Processing:

General Flow—Item 8 (System Agent) sends messages and event information through item 1 (Connector) which in turn sends messages and events to item 2 (Transformer) to allow them to be transformed into a common, system specific format. Item 2 (Transformer) sends system specific events to item 3 (Event Reactor) for distribution to item 4 (Event Processors). Item 4 (Event Processor) receives events it has registered for from item 3 (Event Reactor), analyses the data and, when analysis dictates, takes one of two actions:

1) Sends data back to item 3 (Event Reactor) as a new type of event (recursive call) or 2) Sends a command or commands to the item 5 (Commander) to take action or poll for information from item 8 (System Agents) through item 1 (Connector). Item 1 (Connector) sends any responses from item 8 (System Agent) back to the item 5 (Commander) which in turn returns a possibly modified response to item 4 (Event Processor). (See FIG. 3)

The system allows elements/agents to be connected and controlled by selected DPU. The type of control and the type of elements/agents is not concretely defined. This is a framework to use in multiple industries for wide area control over disparate systems working in a common ecosystem. There are four parts to describing a working system:

1. Define the abstract methods or representation for a problem domain (abstract Commander and Transformer)
2. Define the concrete Commander and Transformers for each System Agent types for a given digital ecosystem.
3. Create or configure concrete Connectors for each System Agent type
4. Describe the a defined system interactions. This is accomplished with concrete versions of Event Processors. This also may possibly discover abstract Commander methods and require concrete implementations of those methods per commander type.

Once the DPU is ready to use for a given digital ecosystem, the system interactions start.

The first step is for a System Agent to decide the optimal DPU to be using. This is done using the Broadcast Request-Reply design pattern. The request is sent to all DPU's on a Multicast/Broadcast network with a payload of the System Agent type. All DPUs with support for the System Agent type return a response to the DPU Requester. The first response to the request will be the selected DPU. The DPU Requester will pass on the information to the System Agent to allow requests to be made directly to the selected DPU. This process should be repeated periodically to ensure the optimal DPU is being used. The process will also be repeated on connectivity failure.

Once that is decided, System Agent events are sent to the Connector, generalized through the Transformer and passed on to the Event Reactor. The Event Reactor uses a Reactor design pattern to allow Event Processors to register for events they are interested in. The Event Reactor then brokers events to the interested Event Processors to be evaluated and potentially acted upon.

The Event Processor takes events potentially from multiple data sources and processes them. This can be done with simple conditional logic, more complex AI algorithms, through an analytics engine or any other method or combination of methods possible. If the Event Processor deems action needs to be taken based on received information, one of two things can be done:

1) The Event Processor may create super event that can be fed back into the Event Reactor for processing by other Event Processors for further analysis
or
2) It can send commands through the Commander and then Connector to various elements to either gather more information directly from System Agents or send commands to take automated action on System Agent(s).

At this point the event has been received, processed and acted upon.

Below are the common logic gates for the abstract system:

Event Reactor—Given an event, for each Event Processor registered for that event type, send the event.

Event Processor—Given event(s), if a threshold is violated, either: 1) create a new event to the Event Reactor or 2) send commands to the Commander to change which in turn sends specific commands to a the given System Agent.

DPU Requester/Responder—The Requester sends a request to all Responders with the System Agent type for the request. If the DPU supports the System Agent type, the Responder returns connection information for that DPU's Connector for the given System Agent type. The first response is selected.

How to Make

The first step to creating this invention for a given industry or problem domain is to define the high level events and commands to be supported. Once those are well understood, abstract classes for the Commander and Transformer are created. There may be several classes of events and controls so there might be more than one abstract class defined. Next concretely define the Commander and Transformer classes per System Agent type.

Once those are defined, the communications protocols to be used need to be understood. Connectors for each communication protocol to be encountered needs to be added or, if not available, created/developed for the code base.

The next step is to create the Event Processors and the logic needed for taking action on given generic events. What is required here will need to be identified by the industry users and what they desire to automate, control and/or report on.

Once those programming steps are complete, we're ready to create a physical DPU. The DPU consists of an independent computer system with a CPU, storage, memory and connectivity (networking) plus an installed version of the code base created earlier.

Once DPUs are created, the physical unit need to be connected to and configured for the network. The System Agent will also need connectivity to this network so they may need to be configured or granted access through a proxy agent. Once this is complete and communication verified, the MAS is complete.

A Multi-cast/Broadcast network will then need to be established and the DPU Requester and Responder configured to use it.

One optional component would be the DPU Requester/Responder. The system can be used without it but it removes system robustness and scalability features. It also requires the System Agents to be configured with DPU connection information making the system more brittle as each element will be bound to a DPU or need to maintain connectivity information for all DPUs.

Conversely, the Request/Responder can be used standalone for other frameworks or systems. It can in fact be used as its own component to distribute load across a bank of web services.

Other optional components are the Transformer and Commander. These would be optional in a situation where all events and commands were the same for all elements or the elements were different enough that there was no commonality. In these cases, the Connector could pass events directly to the Reactor and the Event Processor can send commands directly to the Connector. You might see this where the inventions framework is used for a SCADA system or plant automation where all System Agents are machine elements and each is unique and/or containing sets of homogeneous elements from a vendor/command perspective.

In a wide area configuration, to make the system exceedingly secure and ensure the lowest possible network latency, the DPU's can be connected across a private line, transport network. This allows the purveyor of the system to completely control the network and data. The System Agents could also be added to this network through private lines to increase the security of the network. Bastion hosts could be added to allow access from the public Internet for when desired. The bastions could also work as a fall back to the public Internet in the case of private network disruption or connectivity issues.

It's possible to spread the DPU components across separate computers creating a cluster or bank of functionality for each component. Components could be mixed or separated depending on parallel and/or real-time processing needs. This would be lucrative if one component was requiring a lot of processing while others need guarantees not to be blocked. In this case, the DPU Requester/Responder can be reused to facilitate load balancing across the cluster. This also has other aforementioned benefits of hot deploys/removal of computing resources and robustness at a component level.

This type of configuration would be very likely in situation with high levels of automation or learning AI that requires massive processing. In these examples the Event Processors could be run on a large cluster of computers while the other elements are run on more modest software. This allows the bulk of the processing to the handled with potentially massive processing resources while the rest of the components could probably be well served on a single computer. This also insures that the potential large processing needs of the Event Processor will not interfere with critical and time sensitive act of receiving events.

How to Use

We'll use an electrical grid example. The flow of the electrical grid is controlled by dispatch centers. The system would initially be engineered to enhance the dispatching centers but, as iterative development increases capabilities, eventually those centers should be phased out.

The real utility of this invention comes with the advent of smart grids. The amount of data such as weather, spot utilization from appliances, supplemental energy from home solar panels and other data considerations makes it increasingly difficult if not impossible for human agents to accurately process all the information in a timely manner. Handling this as a DPU MAS solves this problem and allows the data to be processed and reacted to near real time To do this in an optimal manner, the DPU's should be distributed in a wide geographic region. In this way, this system increases the robustness of the electrical grid's MAS. Instead of a single dispatch centers for an area, multiple DPU's can be deployed over a wide geographic region. This can be done at a fraction of the cost of running dispatch centers.

While the energy grids are one example, this invention can be applied to any grid/network problem. There are many industries that would benefit equally well from automation in a wide area.

Additionally, on a smaller scale, a specific utilization can be burned on chips and used in embedded systems or included as a subsystems with a microcomputer. The invention can now be used to control and automate any single unit that reacts to events and requires automation (cars, planes, robots, . . . ) The DPU MAS solution also allows for redundancy and automatic fail-over even at a small area single unit MAS level.

Also, it can create:
Water Utility Coordination and Dispatch
Network operations automation
Network Access Service Request (ASR) Automation
Defense System Control, Coordination and Automation
Robots
Drones
SCADA
Automated Safety Systems for automobiles and airplanes
Exchange and Trading Automation
Medical Systems Coordination and Automation
Machine to Machine Controller
System of System Controller
Any MAS That Requires Event Driven Coordination and Automation

The invention claimed is:

1. A distributed, control system comprising:
a plurality of system agents configured to send events, the plurality of system agents each being further configured to select between a plurality of distributed processors;
a transformer connected to receive events sent by the system agents, the transformer being configured to transform received agent specific events into a common format for processing by the plurality of distributed processors;
said plurality of distributed processors each including an event reactor that reacts to events sent by the system agents, the event reactor using a reactor design pattern to enable a distributed processor to register for events;
said plurality of distributed processors each further including an event processor, the event reactor brokering events to be evaluated and potentially acted upon by the event processors;
the plurality of distributed processors supplying commands to the plurality of system agents for action and response to thereby control and automate reactions to the events while providing redundancy and automatic fail-over.

2. The process of claim 1 wherein the system agent(s) send system events to those particular distributed processors registered to receive said system events, the distributed processors sending responses that the system agents are configured to evaluate the timing of to enable the system agents to select the use of more optimal distributed processors based on which distributed processors respond earlier.

* * * * *